United States Patent [19]
Ghori et al.

[11] Patent Number: 5,428,760
[45] Date of Patent: Jun. 27, 1995

[54] CIRCUITRY AND METHOD FOR SHARING INTERNAL MICROCONTROLLER MEMORY WITH AN EXTERNAL PROCESSOR

[75] Inventors: Amar Ghori, Phoenix; Herve R. Lambert; Steven M. McIntyre, both of Gilbert, all of Ariz.

[73] Assignee: Intel Corporation, Santa Clara, Calif.

[21] Appl. No.: 831,896

[22] Filed: Feb. 6, 1992

Related U.S. Application Data

[63] Continuation-in-part of Ser. No. 807,034, Dec. 12, 1991, abandoned.

[51] Int. Cl.$^6$ .................... G06F 13/16; G06F 12/00
[52] U.S. Cl. .................... 395/425; 395/400; 364/DIG. 1
[58] Field of Search .................... 395/400, 425

[56] References Cited

U.S. PATENT DOCUMENTS

| | | | |
|---|---|---|---|
| 4,099,236 | 7/1978 | Goodman et al. | 395/325 |
| 4,700,292 | 10/1987 | Campanini | 395/200 |
| 4,845,667 | 7/1989 | Höptner et al. | 364/424.01 |
| 5,003,466 | 3/1991 | Schan, Jr. et al. | 395/575 |
| 5,027,297 | 6/1991 | Garitty et al. | 364/569 |
| 5,123,094 | 6/1992 | MacDougall | 395/375 |
| 5,134,691 | 7/1992 | Elms | 395/200 |
| 5,181,231 | 1/1993 | Parikh et al. | 377/26 |
| 5,230,069 | 7/1993 | Brelsford et al. | 395/400 |
| 5,245,695 | 9/1993 | Basehore | 395/3 |
| 5,268,845 | 12/1993 | Startup et al. | 364/483 |
| 5,274,795 | 12/1993 | Vachon | 395/500 |
| 5,291,584 | 3/1994 | Challa et al. | 395/500 |

OTHER PUBLICATIONS

*Microprocessor and Peripheral Handbook*, vol. II, Intel 1989, pp. 9–1 to 9–53.
*Computation Structures*; Ward et al.; 1990, MIT; pp. 248–254.

Primary Examiner—Jack B. Harvey
Assistant Examiner—Michael A. Whitfield
Attorney, Agent, or Firm—Blakely, Sokoloff, Taylor & Zafman

[57] ABSTRACT

Methods and circuitry for sharing a memory space of a microcontroller with a processor. The memory space corresponds to a random access memory accessible by the microcontroller. The memory space includes random access memory on a same substrate as the microcontroller. The processor is located on a different substrate from the microcontroller. The circuitry includes a slave port for communicating data between the processor and the microcontroller. The slave port receives a logical address and a control signal from the processor. The slave port generates an interrupt signal in response to the control signal. An interrupt server generates memory control signals in response to the interrupt signal. A memory controller reads data from and writes data to the slave port and a memory location associated with the logical address in response to the memory control signals.

17 Claims, 6 Drawing Sheets

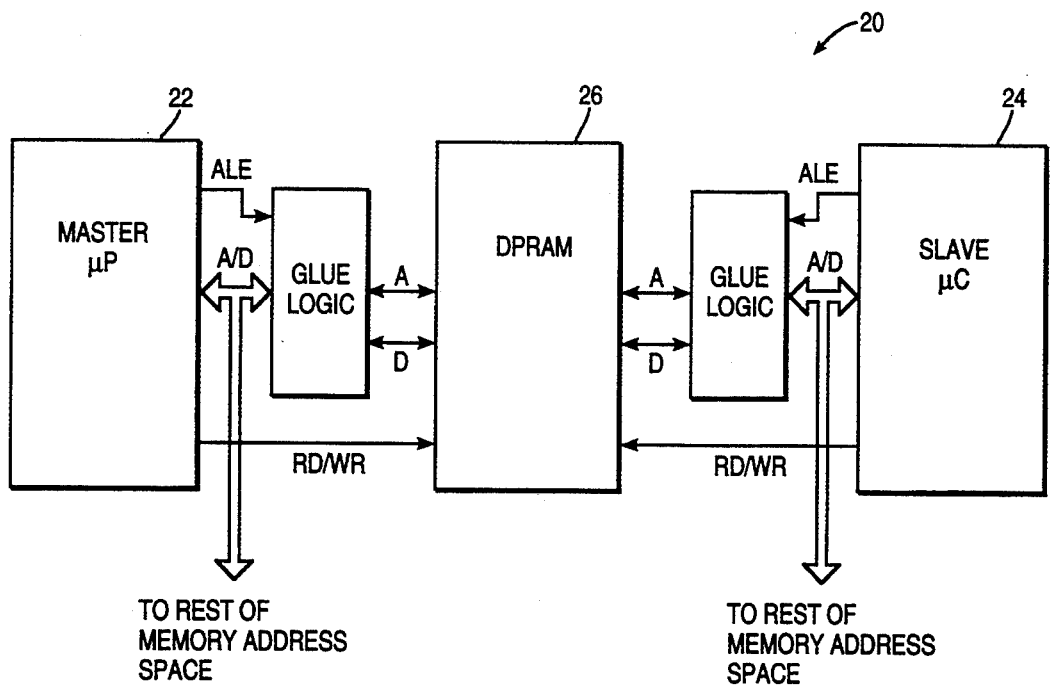
FIG_1 (PRIOR ART)
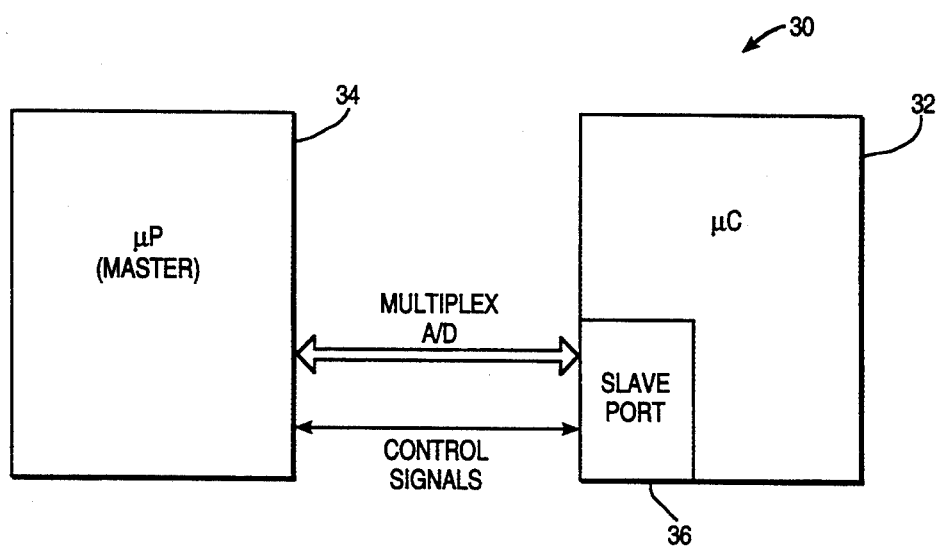
FIG_2

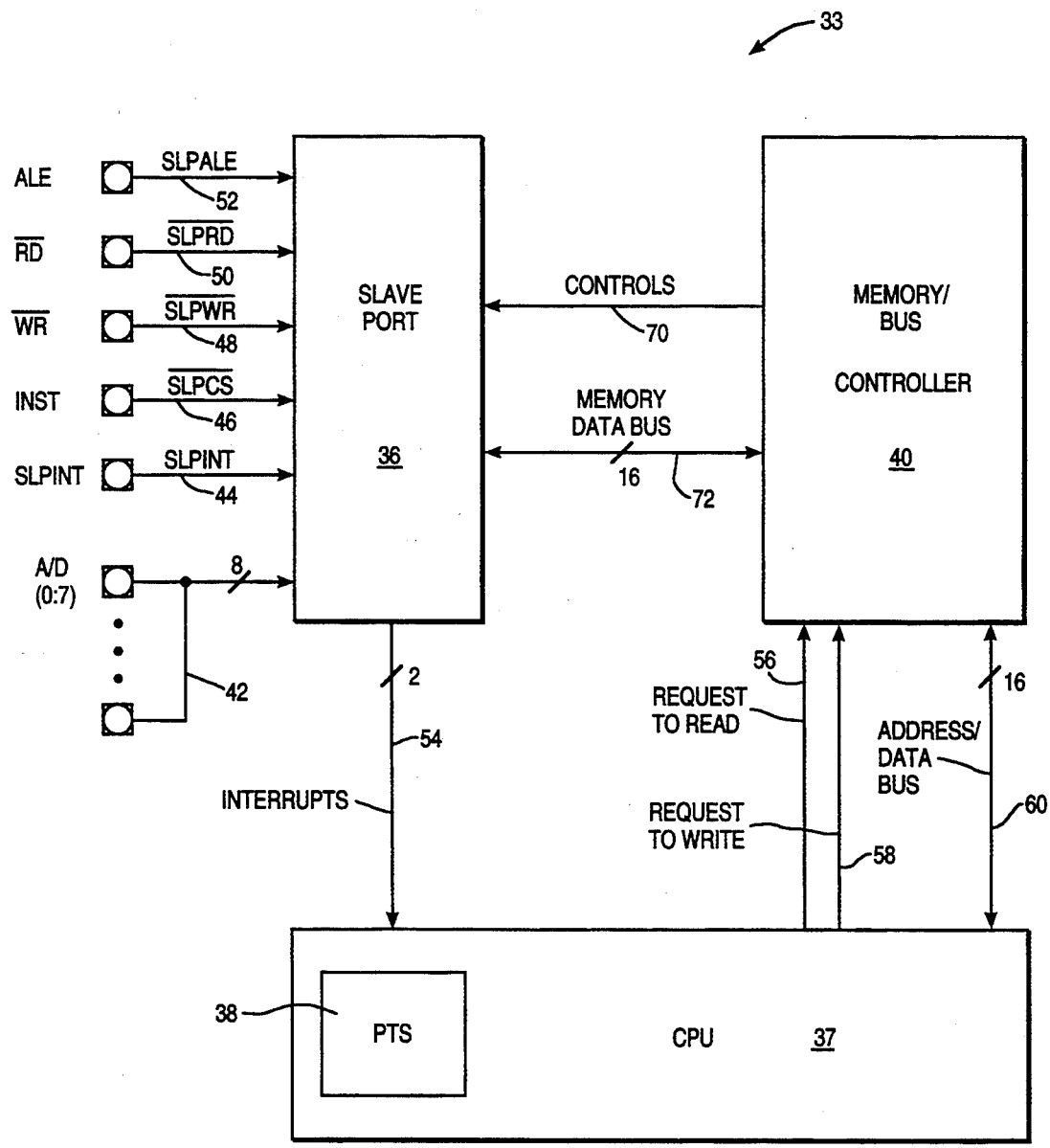
FIG_3

CONTROL/SELECT LOGIC

| OPERATION | INPUTS | | | | | | | OUTPUTS | | |
|---|---|---|---|---|---|---|---|---|---|---|
| | SMM | SLP | $\overline{SLPCS}$ | SLPALE | $\overline{SLPRD}$ | $\overline{SLPWR}$ | SLPADRIEN | SLPDINIEN | SLPDOUTOEN |
| ADDRESS | 1 | 1 | 0 | 1 | X | X | 1 | 0 | 0 |
| READ | 1 | 1 | 0 | X | 0 | X | 0 | 0 | 1 |
| WRITE | 1 | 1 | 0 | X | X | 0 | 0 | 1 | 0 |

TABLE 1
FIG 5

INTERRUPT GENERATOR

| OPERATION | INPUTS | | | | OUTPUTS | | |
|---|---|---|---|---|---|---|---|
| | SMM | SLPDOUTIEN | SLPDINIEN | SLPADRIEN | SLPINT | IREQOBE | IREQIBF |
| ADDRESS (1ST CYCLE OF READ AND WRITE) | 1 | 0 | 0 | 1 | 0 | 0 | 0 |
| 2ND CYCLE OF READ | 1 | 1 | 0 | 0 | 0 | 1 | 0 |
| 2ND CYCLE OF WRITE | 1 | 0 | 1 | 0 | 0 | 0 | 1 |
| READ OR WRITE COMPLETE | 1 | 0 | 0 | 0 | 1 | 0 | 0 |

TABLE 2
FIG 6

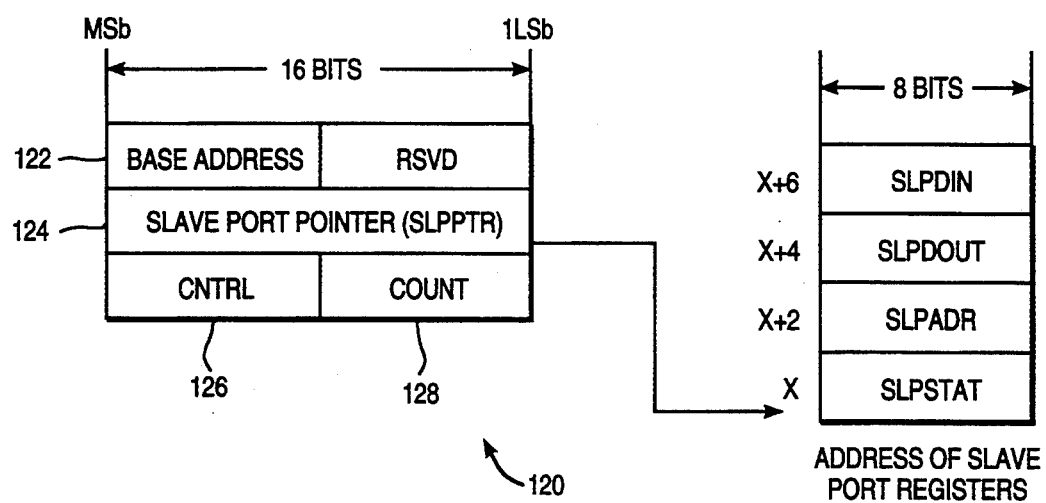
FIG_7

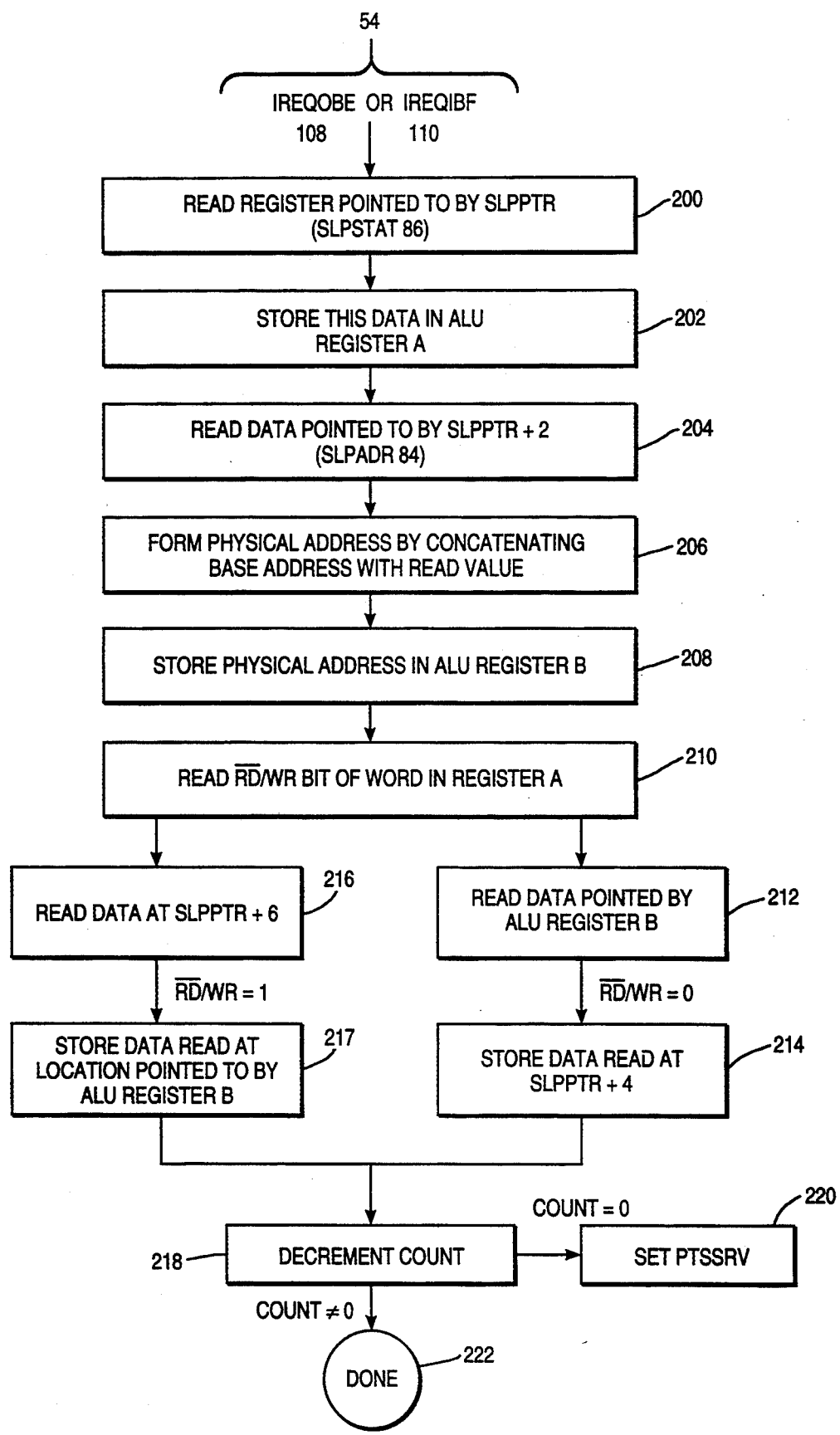
FIG_8

CIRCUITRY AND METHOD FOR SHARING INTERNAL MICROCONTROLLER MEMORY WITH AN EXTERNAL PROCESSOR

RELATED APPLICATIONS

This is a continuation-in-part of application Ser. No. 07/807,034, filed Dec. 12, 1991, now abandoned.

FIELD OF THE INVENTION

The present invention relates to a microcontroller including an information exchange system. More particularly, the present invention pertains to an information exchange system that allows an external processor to access the entire memory space of a microcontroller, including on-board and off-board memory space.

BACKGROUND OF THE INVENTION

Sophisticated control systems typically use multiple processors. Given the particular control system, these processors may need to exchange information. For example, vehicle control systems typically incorporate at least two processors: an engine control unit and an automatic transmission control unit. Information exchange between the two control units allows finer and more intelligent control of both the engine and transmission. For example, information exchange between the engine control unit and automatic transmission control unit allows the reduction of automatic transmission shift shock by suppressing engine torque.

FIG. 1 illustrates in block diagram form prior circuit 20 for exchanging information between two processors in a master-slave configuration. Processor 22 and processor 24 exchange information via a dual port RAM (DPRAM) 26. Additional circuitry, or "glue logic," converts the multiplexed address and data signals from processors 22 and 24 into demultiplexed address and data signals for DPRAM 26.

A disadvantage of prior circuit 20 is that at any one time, the same piece of data must be stored in three separate memory locations: in both, processors 22 and 24 and within DPRAM 26. This is because when microcontroller 22 wishes to make data available to microcontroller 24, it must first place the information in DPRAM 26. Microcontroller 24 then reads the data from DPRAM 26 and stores it within its own internal RAM.

Yet another disadvantage of the prior circuit is that memory updates are very slow because three memory devices must be used in order to share data between two processors.

Yet another disadvantage of prior circuit 20 for exchanging information between processors is that DPRAMs are very expensive. A single DPRAM may cost as much as twenty dollars.

A still further disadvantage of prior circuit 20 for exchanging information between processors is that it increases the number of address and data buses, which in turn increase the external noise that enters the prior circuit. The noise in turn degrades the performance and reliability of the prior circuit.

SUMMARY OF THE INVENTION

An object of the present invention is to provide circuitry and method of exchanging data between two processors that does not require the use of a DPRAM.

Another object of the present invention is to provide cost effective circuitry and method for exchanging information between two processors.

Another object of the present invention is to provide circuitry and method of exchanging information between two processors that utilizes a standard address/data multiplexed protocol, thereby reducing hardware connect and increasing reliability.

A system for sharing the internal memory space of a microcontroller with an external processor is described. The system includes a slave port, an interrupt server and a memory controller. The slave port serves as the external processor's window into microcontroller by passing address signals and data signals between the external processor and the internal memory space of the microcontroller. The slave port responds to a memory access request from the external processor by sending the interrupt server an interrupt signal. The interrupt server responds to the interrupt signal by determining the type of memory access and the physical address of the desired memory location. The interrupt server then generates appropriate memory control signals to cause the memory controller to execute the requested access. The memory controller reads and writes both the internal memory space of the microcontroller and the slave port, as appropriate, in response to memory control signals.

A method of sharing the internal memory space of a microcontroller with an external processor is also described. The external processor initiates a memory access request by inputting a logical address to a slave port within the microcontroller and identifying whether the memory access request is a read or write. An interrupt server responds to the memory access request by generating a physical address from the logical address and a base address. If the memory access request was a read the interrupt server reads the data stored at the physical address and stores it in a data register within the slave port. If, on the other hand, the memory access request was a write the interrupt server reads the data stored by the external master processor in the data register and stores it at the physical address.

Other objects, features, and advantages of the present invention will be apparent from the accompanying drawings and the detailed description that follows

BRIEF DESCRIPTION OF THE FIGURES

The present invention is illustrated by way of example and not limitation in the figures of the accompanying drawings in which references indicate similar elements and in which:

FIG. 1 is a block diagram of a prior circuit for exchanging information between two processors;

FIG. 2 is a block diagram of a circuit for exchanging information between a processor and a microcontroller;

FIG. 3 is a block diagram of an information exchange system;

FIG. 5 is a table describing the operation of control/select logic;

FIG. 6 is a table describing the operation of an interrupt generator;

FIG. 7 is a block diagram of a control block;

FIG. 8 is a state diagram of the algorithm executed by an interrupt server.

DETAILED DESCRIPTION

Figure 4:
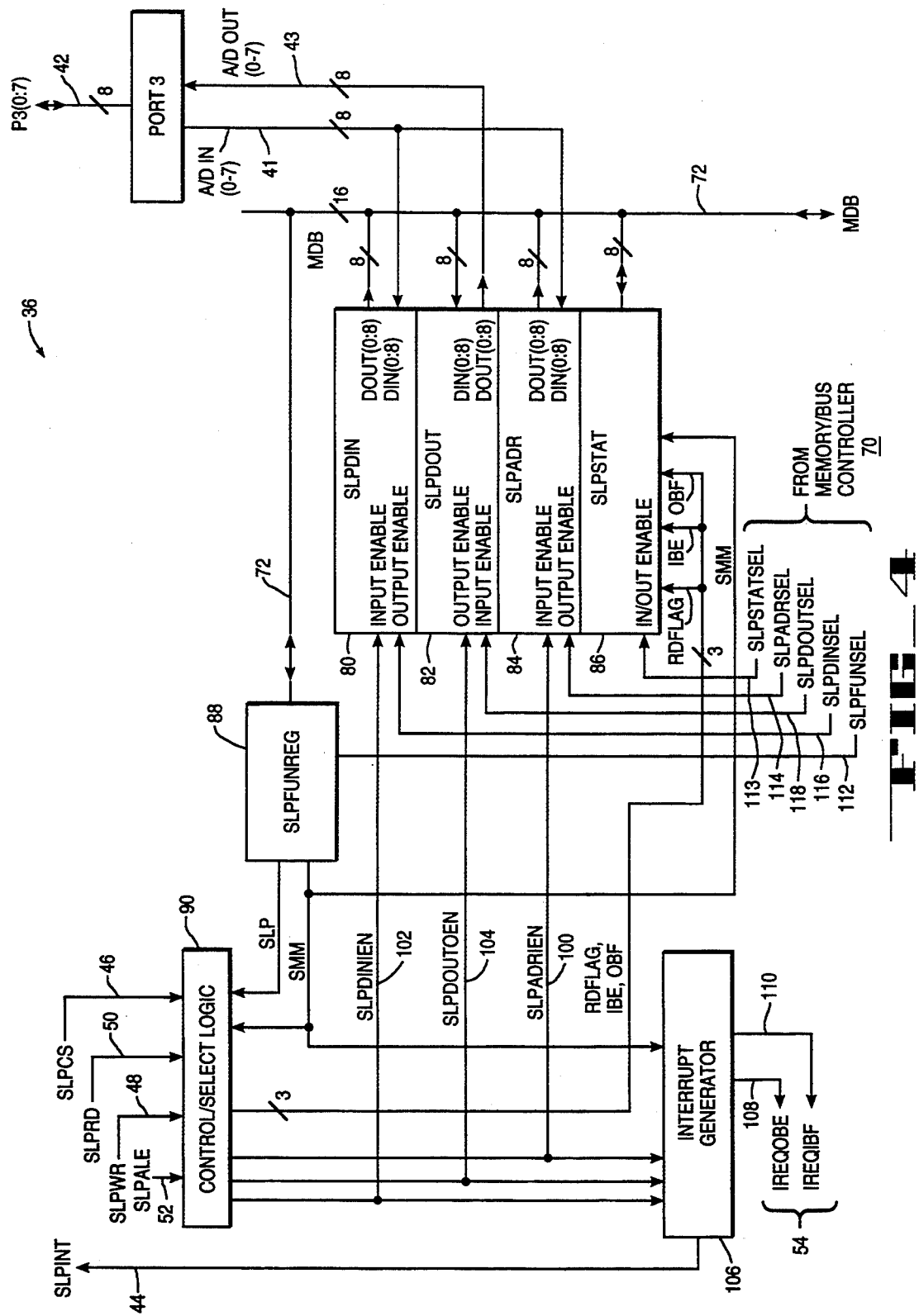
FIG. 4 is a block diagram of a slave port.

FIG. 2 illustrates in block diagram form a circuit 30 for exchanging information between a microcontroller 32 and an external processor 34

As will be described in detail below, microcontroller 32 includes an information exchange system 33 (of FIG. 3) of the present invention. Information exchange system 33 allows external processors to both read and write to the entire memory space of microcontroller 32, both internal and external to microcontroller 32. Information exchange system 33 includes a slave port and an interrupt server. The slave port serves as a window into microcontroller 32 by receiving information from and providing information to processor 34. The interrupt server controls the reading and writing of data within microcontroller 32. One of the interrupt server's tasks is to generate physical addresses for data stored within microcontroller 32 using a logical address provided by external processor 34 and a base address stored within a control block within microcontroller 32. By changing the base address external processor 34 may access any memory location accessible by microcontroller 32, including off-chip memory.

Circuit 30 of FIG. 2 allows the exchange of information between external processor 34 and microcontroller 32 in a master-slave configuration. Microcontroller 32 functions as a slave, suspending its own normal operation to service the memory access requests of external processor 34. External processor 34 simply treats microcontroller 32 as if it were a memory storage device.

Circuit 30 utilizes a multiplexed address/data protocol thereby reducing the hardware interconnect between processors 32 and 34. Circuit 30 also reduces data redundancy because data is stored only in two memory devices, as compared to three in prior circuit 20.

Information exchange system 33 (of FIG. 3) controls the exchange of information between processor 34 and microcontroller 32. Information exchange system 33 implements an event driven protocol. This permits external processor 34 to request a memory access from microcontroller 32 and continue with normal operation while the memory access request is pending. Microcontroller 32 also operates normally until it receives a memory access request.

Within circuit 30 only one processor need include an information exchange system 33 (of FIG. 3). The processor incorporating information exchange system 33 must be a microcontroller; i.e. it must include a CPU, internal memory and input/output circuitry. The master processor 34 may be considerably less sophisticated, however.

In a preferred embodiment the shared memory mode realized by information exchange system 33 is but one mode provided by microcontroller 32. Implementing many modes requires that microcontroller 32 share system resources between multiple modes. For example, in shared memory mode a system input/output port is utilized as a slave port. Sharing information with processor 34 thus requires enabling the shared memory mode.

The shared memory mode is enabled by setting two bits (SLP and SMM) situated within microcontroller 32. Slave port bit SLP enables the slave port to utilize the system port. Shared memory mode bit SMM disables the normal function of the slave port and enables shared memory mode. SMM also triggers a transition on a slave port interrupt pin SLPINT (of FIG. 3), signalling to processor 34 the readiness of microcontroller 32 to respond to memory access requests.

Ensuring the successful completion of a memory access request also requires the initialization of a control block residing within the register RAM of microcontroller 32. The control block will be discussed in detail below.

FIG. 3 illustrates in block diagram form an information exchange system 33. Information exchange system 33 includes slave port 36, peripheral transaction server 38 and memory/bus controller 40.

External processor 34 receives and transmits address-/data signals via slave port 36. Address and data signals are coupled to A/D(0:7) 42. Other slave port signals include slave port interrupt SLPINT 44, slave port chip select $\overline{SLPCS}$ 46, slave port write $\overline{SLPWR}$ 48, slave port read $\overline{SLPRD}$ 50, and slave port address latch enable SLPALE 52. In response to these signals, slave port 36 generates two interrupt signals 54 that are sent to peripheral transaction server 38.

In a preferred embodiment, slave port 36 is implemented as a logical port structure. Slave port 36 is logical in that it does not have any physical port pins, but shares a system port when the shared memory mode of microcontroller 32 is enabled.

PTS 38 automatically transfers data to and from the internal memory location corresponding to the address signal provided by external processor 34. PTS 38 interprets interrupts 54 and generates the appropriate signals to cause memory/bus controller 40 to transfer the data to the appropriate location within microcontroller 32. Control signals generated by PTS 38 for memory/bus controller 40 include a request to read signal 56 and a request to write signal 58. Necessary address and data signals are exchanged between PTS 38 and memory/bus controller 40 via address/data bus 60.

In a preferred embodiment peripheral transaction server 38 is realized as dedicated microcode residing within CPU 37 of microcontroller 32.

Memory/bus controller 40 responds to signals 56, 58, and 60 by generating appropriate control signals 70 to transfer data to and from slave port 36. Memory data is exchanged between slave port 36 and the memory/bus controller 40 via internal memory data bus 72.

Memory/bus controllers are well known and will not not be discussed in detail herein.

Reading and writing to microcontroller 32 in shared memory mode is relatively simple. External processor 34 initiates a read by forcing slave port chip select $\overline{SLPCS}$ 46 to a logic low, placing an address on the slave port A/D bus 42 while pulsing slave port address latch enable SLPALE 52 active high. Slave port 36 responds by latching the address received from external processor 34 on SLPALE's falling edge. External processor 34 then signifies that the access is a read by pulsing slave port read $\overline{SLPRD}$ 50 low. Slave port 36 signals a pending read request by driving slave port interrupt signal SLPINT 44 low. At this time slave port 36 also outputs data from a previous read request onto system bus 42. Normally, data output on bus 42 would be data from the previous read request, but the data output in response to a first read request is irrelevant and should be ignored by master processor 34. Because information exchange system 33 is interrupt driven, external processor 34 is free to resume normal code execution while the read request is pending.

In response to the active low signal on $\overline{SLPRD}$ 50, slave port 36 generates an interrupt 54 for PTS 38.

Memory/bus controller 40 reads the data requested by external processor 34 and writes it to slave port 36. Afterward, slave port 36 pulls SLPINT 44 high, signalling to external processor 34 that the pending read request has been completed.

Read requests may be pipelined so that external processor 34 can provide the address for a new read request while reading data from the previous read request. Further, separate registers are provided for read and write data so that read and write request may be interspersed without data collision.

Write requests are also initiated by bringing $\overline{\text{SLPCS}}$ 46 low, placing an address on slave port system bus 42 while pulsing slave port address latch enable active high. Once again, the address is latched into slave port 36 when SLPALE 52 transition is low. External processor 34 then places the data to be written into microcontroller 32 onto bus 42 and pulses $\overline{\text{SLPWR}}$ 48 low. Slave port 36 signals a pending write request by driving SLPINT 44 low. External processor 34 may then resume normal code execution while the write request is pending. Slave port 36 responds to the active signal on $\overline{\text{SLPWR}}$ 48 by latching the data input on system bus 42 and by generating an interrupt signal 54. After the data has been written into the memory of microcontroller 32, slave port 36 forces slave port interrupt pin SLPINT 44 high, signalling to master processor 34 that the pending write request has been completed.

The logical port structure of slave port 36 is shown in block diagram in FIG. 4. Slave port 36 includes five memory mapped registers: slave port data input register, SLPDIN 80, slave port data output register, SLPDOUT 82, slave port address register, SLPADR 84, slave port status register, SLPSTAT 86, and slave port function register, SLPFUNREG 88. Registers SLPSTAT 86, SLPADR 84, SLPDIN 80 and SLPDOUT 82 reside in contiguous word memory space.

Slave port function register 88 must be initialized before external processor 34 can access the memory space of microcontroller 32. Slave port function register 88 stores slave port bit SLP and shared memory mode bit SMM, which must be set as previously discussed to enable shared memory mode. Slave port function register 88 is inaccessible to external master processor 34;therefore, SMM and SLP must be initialized by microcontroller 32.

Slave port status register 86 is read by peripheral transaction server 38 to determine whether a memory access request by external processor 34 is a read or a write. PTS 38 determines the type of access by reading the read/write status bit. In the preferred embodiment, the read/write status bit is systematically reset to indicate a read at the end of every read or write access. If the next access request from external processor is a read, the read/write status bit is left unchanged. On the other hand, if the next access request is a write, then the read/write status bit is toggled. Slave port status register 86 receives the input buffer empty bit, IBE from control select logic 90. IBE is cleared when external master processor 34 writes to slave port data input register 80 and is set to a one when the microcontroller 32 reads register 80. Status register 86 also receives the output buffer full bit, OBF from control select logic 90. OBF is cleared after external processor 34 reads data from slave port data output register 82. Similarly, OBF is set to logic 1 whenever microcontroller 32 writes to register 82.

Slave port address register 84 stores the lower byte of the 16-bit address of the location to be accessed. Slave port address register 84 latches the lower byte on the falling edge of SLPALE 52.

When external processor 34 writes to data input register 80 the IBE bit of slave port status register 86 is set to a logic 0. Analogously, when slave port data input register 80 is read, the IBE flag is set.

Slave port data output register 82 is yet another register shared with a system port of microcontroller 32. Data to be read by external processor 34 is written into output buffer 82 by CPU 37. Whenever information is written into data output buffer 82, the OBF bit in slave port status register 86 is set to a 1. OBF is cleared to a 0 whenever external processor 34 reads slave port data output register 82.

The preferred embodiment of slave port 36 utilizes both a data input register and a data output register to allow the interspersing of read and write requests without data collision. Alternatively, a single data register may be utilized if the interspersion of read and write requests is not desired.

Control/select logic 90 receives a variety of control signals from external processor 34 with which it generates input and output enables for slave port registers. Inputs include slave port address latch enable SLPALE 52, slave port write $\overline{\text{SLPWR}}$ 48, slave port read $\overline{\text{SLPRD}}$ 50, and slave port chip select $\overline{\text{SLPCS}}$ 46. By combining inputs 46, 48, 50 and 52 with the SLP and SMM bits from slave port function register 88, control/select logic 90 generates a number of input and output enables for slave port registers.

Outputs generated by control/select logic 90 includes slave address input enable SLPADRIEN 100, slave port data input input enable SLPDINIEN 102, and slave port data output output enable SLPOUTOEN 104.

Slave port address input enable signal, SLPADRIEN 100, when active high allows address data on A/-DIN(0:7) 41 to be written into slave port address register 84. Similarly, when active high, the slave port data input input enable signal, SLPDINIEN 102, allows data on A/DIN(0:7) 41 to be written into slave port data input register 80.

Data is output from slave port data output register onto A/DOUT(0:7) 43. when slave port data output enable signal, SLPDOUTOEN 104, is active high.

Control/select logic 90 is implemented as random logic, the operation of which is indicated in Table 1 of FIG. 5.

Interrupt generator 106 generates interrupt requests for PTS 38 using output signals from control/select logic 90. The operation of interrupt generator 106 is described in Table 2 of FIG. 6.

Interrupt generator 106 generates three outputs signals: slave port interrupt signal, SLPINT 44, interrupt request output buffer empty IREQOBE 108, and interrupt request input buffer full signal IREQIBF 110.

SLPINT 44 is output to external processor 34 and indicates whether microcontroller 32 can respond to a read or write request. Slave port interrupt signal 44 is a logic 0 when it is unavailable to perform a read or write request because it is currently servicing a previous memory access request and is a logic 1 when it is ready to service another memory access request. Thus, whenever a read or write request is completed, SLPINT 44 transitions from a low to a high.

Interrupt generator 106 pulses IREQOBE 108 active high in response to a read request from external processor 34. Similarly, IREQIBF 110 is pulsed active high when external processor 34 requests a write.

Under the direction of PTS 38, memory/bus controller 40 moves data between slave port 36 and the entire memory space of microcontroller 32, which includes the internal memory as well as external memory of microcontroller 32. Control signals from memory/bus controller 40 include slave port function select signal, SLPFUNSEL 112, slave port status select signal, SLPSTATSEL 113, slave port address select, SLPADRSEL 114, slave port data input select SLPDINSEL 116, and slave port data output select SLPDOUTSEL 118.

When active SLPFUNSEL 112 selects SLPFUN-REG 88, which permits the slave port to be initialized to a known state and the shared memory mode to be enabled.

Memory/bus controller 40 brings SLPSTATSEL 113 active high whenever PTS 38 requests a read of slave port status register 86. Slave port address select signal 114 goes active high when PTS 38 requests a read of slave port address register 84. In response to an active level on SLPADRSEL 114, data stored within register 84 flows on to memory data bus 72.

Data to be written to microcontroller 32 is read from register SLPLDIN 80 when SLPDINSEL 116 is active, which allows data within register 80 to flow onto memory data bus 72. Similarly, data which microprocessor 34 requested to read is transferred from memory to SLPDOUT over bus 72 when SLPDOUTSEL 118 is active.

Peripheral transaction server 38 responds to interrupts 54 and translates the 8-bit logical addresses provided by external processor 34 into 16-bit physical addresses. To permit the entire memory space of microcontroller 32 to be shared efficiently over an 8-bit bus 42, the entire memory space of microcontroller 32 is divided into 256 non-overlapping pages of 256 bytes each. External processor 34 need only specify the number of bytes it wishes to access in a certain page and thereafter give only an 8-bit logical address for those data accesses. The base address and byte count are stored in a PTS control block resident in the register RAM of microcontroller 32.

FIG. 7 illustrates the organization of control block 120. Control block 120 is a 6-byte, quad-word aligned block of register RAM. Control block 120 may reside anywhere in the register RAM space of microcontroller 32.

Control block 120 stores several important variables that are initially set by microcontroller 32 and may be changed by external processor 34. These variables include a base address, also referred to as a page index, a slave port pointer,SLPPTR and a COUNT field.

Base address 122 of control block 120 stores the upper 8-bits of the addresses that external processor 34 wishes to access. The page in which the control block is stored is called the default page. The control block can be accessed and modified by external processor 34 only when base address 122 is set to the default page.

The 8-bit count 128 indicates the number of accesses to be made to the base address 122. Count 128 also determines the number of data transfers that will occur before a normal software interrupt is serviced by microcontroller 32. The maximum number allowed is 256 in the preferred embodiment.

A software interrupt suspends normal operation to execute a general purpose interrupt service routine. A PTS interrupt is a microcoded, fixed, customized, interrupt service routine for a microcontroller peripheral, such as the slave port. Because of this difference, PTS interrupts can be serviced more quickly than normal software interrupts.

PTS 38 uses count 128 to determine when base address 122 should be reset to the default page. Preferably, count 128 is decremented after each memory access request. When count 128 is decremented to zero, it causes a normal software interrupt request, which should reset base address 122 to the default page.

Slave port pointer SLPPTR 124 is a 16 bit physical address that preferably points to slave port status register 86.

For PTS 38 to successfully service memory access requests in the preferred embodiment, the addresses of other slave port registers must also be stored in contiguous memory locations relative to the slave port status register to ensure the successful operation of PTS 38. Specifically, the address of slave port address register 84 must be stored at SLPPTR+2, the address of slave port output register 82 must be stored at SLPPTR+4, and the address of slave port input register 80 must be stored at SLPPTR+6.

Control field 126 indicates to PTS 38 that microcontroller 32 is operating in shared memory mode when initialized to 70 hexadecimal, as opposed to other operating modes realized by microcontroller 32.

FIG. 8 illustrates the algorithm executed by PTS 38 in response to interrupts 54.

Throughout the following discussion it will be understood that phrases such as "PTS reads," "PTS writes," "PTS stores" refer to the joint actions of PTS 38 and memory/bus controller 40. PTS 38 performs reads by sending memory/bus controller 40 a request to read coupled with the physical address (i.e. 16-bit address) of the memory location to be read. PTS 38 performs writes in a similar fashion, generating a request to write for memory/bus controller 40 coupled with the physical address of the memory location to be written.

Peripheral transaction server 38 begins execution in step 200 in response to an active interrupt request 54. PTS 38 responds by first reading the register pointed to by slave port pointer 124. Given the proper initialization of control block 120, slave port pointer 124 points to slave port status register SLPSTAT 86. Thus, the first action of PTS 38 is to read slave port status register SLPSTAT 86.

In step 202, PTS 38 stores the data read from slave port status register 86 in a temporary ALU register, register A.

PTS 38 then determines in step 204 the physical address of the particular byte that external processor 34 wishes to access. PTS 38 begins this process by reading the data pointed to by SLPPTR+2, which should point to slave port address register SLPADR 84.

In step 206, PTS 38 concatenates the 8-bits read from slave port address register 84 with the base address 122 stored in control block 120. Concatenating these two values produces the 16-bit physical address of the data which external processor 34 wishes to access. This 16-bit address is stored in another ALU temporary register, register B, in step 208 until PTS 38 determines the type of access external processor 34 has requested.

In step 210, PTS 38 determines the type of access by reading a copy of the read/write status bit. The read/- write status bit resides in the slave port status register but is copied into ALU temporary register A.

If the requested action is a read, the read write bit will be a logic 0 and PTS 38 responds in step 212 by reading the data pointed to by the 16-bit address stored in ALU temporary register B. The data read at that address is then stored at an address pointed to by SLPPTR+4. In other words, the data read will be stored in the slave port data output register 82 in step 214. This data will be output the next time external processor 84 initiates another read of microcontroller 32.

Having completed the requested read access, PTS 38 then decrements the count field 128 and stores the new value back into control block 120 in step 218. If the new value of count field 128 is equal to zero, PTS 38 sets PTSSRV in step 220. PTSSRV is a software interrupt generated by interrupt server 38. PTSSRV directs control of microcontroller 32 to a user programmed software routine that resets the base address to the default page. In the default page, the control block is accessible by external processor 34, allowing the updating of base address 122.

Having serviced the most recent interrupt request, PTS 38 awaits a new interrupt request in step 222.

If, on the other hand, the read/write bit stored in temporary register A is a logic 1, then a write access was requested. PTS 38 responds to the write request by branching to step 216 and by reading the data stored at the address pointed to by SLPPTR+6. In other words, PTS 38 reads the slave port data input register 80. That data is then written to the memory location pointed to by the 16-bit address stored in ALU temporary register B in step 217. Afterward, PTS 38 decrements the count field 128 and stores a new value as before.

In the preferred embodiment interrupt server PTS 38 is realized as dedicated microcode. The use of dedicated microcode reduces the time the interrupt server takes to respond to read and write requests. Alternatively, the PTS 38 can be realized using software interrupt service routines.

A preferred embodiment of information exchange system 33 generates two interrupt request signals, IREQOBE 108 and IREQIBF 110. Alternatively, interrupt generator 106 may be modified to generate a single interrupt signal because PTS 38 determines the type of memory access request by reading slave port status register 86.

Thus, a circuit allowing a microcontroller to share its entire memory space with an external processor has been described. The circuit includes a slave port and a dedicated interrupt server.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. Microcontroller circuitry for sharing a memory space of a microcontroller with a processor, comprising:
   a) a slave port for communicating data between the processor and the microcontroller wherein the processor is located on a different substrate from the microcontroller, the slave port receiving a logical address and a control signal from the processor, wherein the logical address is associated with a memory location in the memory space, the slave port generating an interrupt signal in response to the control signal;
   b) an interrupt server for generating memory control signals in response to the interrupt signal; and
   c) a memory controller for reading data from and writing data to the slave port and the memory location in the memory space in response to the memory control signals, wherein the memory space corresponds to a random access memory accessible by the microcontroller, wherein a shared memory space includes random access memory on a same substrate as the microcontroller.

2. The microcontroller circuitry of claim 1 wherein the interrupt server comprises:
   a) circuitry for reading a status register pointed to by a slave pointer;
   b) circuitry for determining a type of memory access requested by the processor;
   c) circuitry for determining a physical address of the memory location associated with the logical address; and
   d) circuitry for generating the memory control signals.

3. The microcontroller circuitry of claim 2 wherein the circuitry for determining the physical address of the memory concatenates the logical address with a base address stored in a control block in the memory space.

4. The microcontroller circuitry of claim 2 wherein the interrupt server further comprises microcode.

5. The microcontroller circuitry of claim 2, wherein the microcontroller and the processor utilize a multiplexed address/data communications protocol.

6. The microcontroller circuitry of claim 2 wherein the slave port further comprises:
   a) an address register coupled to receive the logical address;
   b) a data register for storing data communicated between the processor and the microcontroller;
   c) control logic for generating register control signals in response to the control signal from the processor; and
   d) an interrupt generator for generating the interrupt signal in response to the register control signals;

7. The circuitry of claim 6 wherein the data register comprises:
   a) a data input register for receiving data to be written to the memory from the processor;
   b) a data output register for providing data read from the memory to the processor.

8. The microcontroller circuitry of claim 6 wherein the slave port further comprises the status register coupled to the control logic and the interrupt generator for indicating the status of the slave port to the interrupt server.

9. The microcontroller circuitry of claim 2 wherein the slave port is a logical port utilizing a pre-existing input/output port of the microcontroller.

10. A method of sharing a memory space of a microcontroller with a processor, comprising the steps of:
   a) providing a logical address originating from the processor to a slave port of the microcontroller;
   b) providing a memory access request from the processor to the slave port of the microcontroller;
   c) storing a received data value from the processor in a data register accessible by the processor if the memory access request is a write request;

d) generating a physical address of a memory location in the memory space from the logical address, wherein the physical address corresponds to a random access memory in the memory space accessible by the microcontroller, wherein the memory space includes random access memory residing on a same substrate as the microcontroller;

e) storing a retrieved data value from the physical address in the data register if the memory access request is a read request; and f) storing the received data value from the data register in the memory location if the memory access request is a write request.

11. A method of sharing a memory space of a microcontroller with a processor, comprising the steps of:

a) storing a base address in a control block in the memory space;

b) storing a count representing the number of pending memory access operations requested in a count field of the control block;

c) determining a physical address corresponding to a logical address provided by the processor to a slave port of the microcontroller, wherein the physical address corresponds to a random access memory in the memory space accessible by the microcontroller, wherein the memory space includes random access memory residing on a same substrate as the microcontroller;

d) determining a type of a memory access request provided by the processor to the slave port;

e) executing the memory access request;

f) decrementing the count stored in the count field; and g) repeating steps e) and f) until the count represents that no more memory access operations are pending.

12. The method of claim 11 wherein the step of determining a physical address of the logical address comprises concatenating the base address and the logical address.

13. The method of claim 11 wherein the step of executing the memory access request for a read request further comprises the steps:

1) retrieving a data value located at the physical address; and 2) storing the data value in a data register accessible by the processor.

14. The method of claim 11 wherein the step of executing the memory access request for a write request further comprises the steps:

1) retrieving a data value provided by the processor from a data register; and 2) storing the data value at the physical address.

15. The method of claim 11 further comprising the step of:

h) resetting the base address to a default page.

16. The method of claim 15 wherein the processor can access the control block only when the base address is set to the default page.

17. The method of claim 16 wherein the base address is reset by a user-programmed software routine in response to a software interrupt signal generated by the slave port when the count represents that no more memory access operations are pending.

* * * * *